(12) United States Patent
Gutt et al.

(10) Patent No.: US 7,711,796 B2
(45) Date of Patent: May 4, 2010

(54) GATEWAY REGISTRY METHODS AND SYSTEMS

(75) Inventors: Gerald Gutt, Tucson, AZ (US); Aaron Wood, Boulder Creek, CA (US)

(73) Assignee: iControl Networks, Inc., Palo Alto, CA (US)

( * ) Notice: Subject to any disclaimer, the term of this patent is extended or adjusted under 35 U.S.C. 154(b) by 273 days.

(21) Appl. No.: 11/761,718

(22) Filed: Jun. 12, 2007

(65) Prior Publication Data

US 2007/0286369 A1 Dec. 13, 2007

Related U.S. Application Data

(60) Provisional application No. 60/804,550, filed on Jun. 12, 2006.

(51) Int. Cl.
*G06F 15/16* (2006.01)
*H04L 12/28* (2006.01)

(52) U.S. Cl. ........................ 709/217; 370/401

(58) Field of Classification Search .............. 370/401, 370/466; 700/17, 25, 19, 83; 709/203, 217, 709/219, 228, 229, 249; 713/168, 171, 181; 717/167, 172; 379/121.01
See application file for complete search history.

(56) References Cited

U.S. PATENT DOCUMENTS

| | | | |
|---|---|---|---|
| 5,519,878 | A | 5/1996 | Dolin, Jr. |
| D416,910 | S | 11/1999 | Vasquez |
| 5,991,795 | A | 11/1999 | Howard et al. |
| 6,198,479 | B1 | 3/2001 | Humpleman |
| 6,219,677 | B1 | 4/2001 | Howard |
| 6,286,038 | B1 * | 9/2001 | Reichmeyer et al. ........ 709/220 |
| 6,288,716 | B1 | 9/2001 | Humpleman et al. |
| D451,529 | S | 12/2001 | Vasquez |
| 6,331,122 | B1 | 12/2001 | Wu |
| 6,363,417 | B1 | 3/2002 | Howard et al. |
| 6,370,436 | B1 | 4/2002 | Howard et al. |
| 6,377,861 | B1 | 4/2002 | York |
| 6,400,265 | B1 | 6/2002 | Saylor et al. |
| D464,328 | S | 10/2002 | Vasquez et al. |
| D464,948 | S | 10/2002 | Vasquez et al. |

(Continued)

FOREIGN PATENT DOCUMENTS

JP       2003-85258 A       9/2001

(Continued)

OTHER PUBLICATIONS

Alarm.com—Interactive Security Systems, Product Advantages, printed from website Nov. 4, 2003, 3 pp.

(Continued)

*Primary Examiner*—Wing F Chan
*Assistant Examiner*—Jonathan Willis
(74) *Attorney, Agent, or Firm*—Wilson Sonsini Goodrich & Rosati

(57) ABSTRACT

A gateway device for managing a set of two or more local management devices at a location. A system for networks at a plurality of locations. A method of operating a gateway device in a control network. A method for storing information to operate a gateway device in a control network. A method for storing information to operate a replacement gateway device in a control network.

35 Claims, 7 Drawing Sheets

U.S. PATENT DOCUMENTS

| | | | |
|---|---|---|---|
| 6,467,084 B1 | 10/2002 | Howard et al. | |
| 6,493,020 B1 | 12/2002 | Stevenson et al. | |
| 6,496,927 B1 | 12/2002 | McGrane et al. | |
| 6,529,723 B1 | 3/2003 | Bentley | |
| 6,542,075 B2 | 4/2003 | Barker et al. | |
| 6,563,800 B1* | 5/2003 | Salo et al. | 370/264 |
| 6,574,234 B1 | 6/2003 | Myer et al. | |
| 6,580,950 B1 | 6/2003 | Johnson et al. | |
| 6,587,736 B2 | 7/2003 | Howard et al. | |
| 6,591,094 B1 | 7/2003 | Bentley | |
| 6,601,086 B1 | 7/2003 | Howard et al. | |
| 6,609,127 B1 | 8/2003 | Lee et al. | |
| 6,615,088 B1 | 9/2003 | Myer et al. | |
| 6,648,682 B1 | 11/2003 | Wu | |
| 6,661,340 B1 | 12/2003 | Saylor et al. | |
| 6,721,689 B2 | 4/2004 | Markle et al. | |
| 6,965,313 B1 | 11/2005 | Saylor et al. | |
| 7,015,806 B2 | 3/2006 | Naidoo et al. | |
| 7,113,090 B1 | 9/2006 | Saylor et al. | |
| 7,349,761 B1 | 3/2008 | Cruse | |
| 7,469,294 B1* | 12/2008 | Luo et al. | 709/229 |
| 7,526,762 B1* | 4/2009 | Astala et al. | 717/171 |
| 2002/0083342 A1 | 6/2002 | Webb et al. | |
| 2002/0103927 A1 | 8/2002 | Parent | |
| 2002/0111698 A1* | 8/2002 | Graziano et al. | 700/17 |
| 2002/0143923 A1* | 10/2002 | Alexander | 709/223 |
| 2002/0180579 A1 | 12/2002 | Nagoka et al. | |
| 2002/0184301 A1 | 12/2002 | Parent | |
| 2003/0051009 A1 | 3/2003 | Shah et al. | |
| 2003/0132018 A1 | 7/2003 | Okita et al. | |
| 2003/0187920 A1* | 10/2003 | Redkar | 709/203 |
| 2003/0210126 A1* | 11/2003 | Kanazawa | 340/5.5 |
| 2004/0003241 A1* | 1/2004 | Sengodan et al. | 713/168 |
| 2004/0015572 A1* | 1/2004 | Kang | 709/220 |
| 2005/0079855 A1 | 4/2005 | Jethi et al. | |
| 2005/0169288 A1* | 8/2005 | Kamiwada et al. | 370/401 |
| 2005/0197847 A1 | 9/2005 | Smith | |
| 2005/0216302 A1 | 9/2005 | Raji et al. | |
| 2005/0216580 A1 | 9/2005 | Raji et al. | |
| 2006/0181406 A1 | 8/2006 | Petite et al. | |
| 2007/0286210 A1 | 12/2007 | Gutt et al. | |
| 2008/0180240 A1 | 7/2008 | Raji et al. | |
| 2008/0183842 A1 | 7/2008 | Raji et al. | |

FOREIGN PATENT DOCUMENTS

| | | |
|---|---|---|
| JP | 2003-141659 | 10/2001 |
| JP | 2004-192659 | 2/2004 |
| KR | 2006-0021605 | 9/2004 |
| WO | WO-01-52478 | 7/2001 |
| WO | WO-01-99078 | 12/2001 |
| WO | WO-2004-004222 | 1/2004 |
| WO | WO-2004-107710 | 12/2004 |
| WO | WO 2005/091218 A2 | 9/2005 |
| WO | WO 2005/091218 A3 | 9/2005 |

OTHER PUBLICATIONS

Alarm.com—Interactive Security Systems, Frequently Asked Questions, printed from website Nov. 4, 2003, 3 pp.
Alarm.com—Interactive Security Systems, Elders, printed from website Nov. 4, 2003, 1 page.
Alarm.com—Interactive Security Systems, Overview, printed from website Nov. 4, 2003, 2 pp.
X10—ActiveHome, Home Automation Made Easy!, printed from website Nov. 4, 2003, 3 pp.
Examination Report under Section 18(3) re UK patent application No. GB0724760.4 dated Jan. 30, 2008.
Examination Report under Section 18(3) re UK patent application No. GB0724248.0 dated Jan. 30, 2008.
Examination Report under Section 18(3) re UK patent application No. GB0724248.0 dated Jun. 4, 2008.
Examination Report under Section 18(3) re UK patent application No. GB0800040.8 dated Jan. 30, 2008.
Examination Report under Section 18(3), dated Aug. 13, 2007 re UK patent application No. GB0620362.4.

* cited by examiner

GATEWAY REGISTRY METHODS AND SYSTEMS

CROSS-REFERENCE

This application claims the benefit of U.S. Provisional Application No. 60/804,550, filed Jun. 12, 2006, which application is incorporated herein by reference.

BACKGROUND

Vendors such as premises vendors, communication service vendors, and Internet portal vendors may desire to extend their relationship with vendees beyond the immediate transaction. Additionally, vendees desire additional premises management services beyond the immediate transaction for premises, communication services, or Internet portals. There is a need for advanced premises management services, methods, devices, and systems.

INCORPORATION BY REFERENCE

All publications and patent applications mentioned in this specification are herein incorporated by reference to the same extent as if each individual publication or patent application was specifically and individually indicated to be incorporated by reference. The following application incorporates by reference application Ser. No. 11/084,232, filed on Mar. 16, 2005 and application Ser. No. 11/084,657 filed on Mar. 16, 2005, in their entirety.

DETAILED DESCRIPTION

While preferred embodiments of the present invention have been shown and described herein, such embodiments are provided by way of example only. Various alternatives to the embodiments of the invention described herein may be employed in practicing the invention.

Certain embodiments include methods, devices and systems for initializing and validating a system gateway device, also referred to as a gateway or a gateway device, which is used to manage a local network of location management devices at a location. The network and/or the devices may be managed using the gateway and can manage the network and/or devices from a location remote from the location of the devices and/or gateway. The location of the devices, for example, can be a premises such as a residence or business premises, and the devices including, for example, a thermostat or a camera, can be managed at the premises from a remote location such as, for example, from an office or using a cellular phone.

Figure 1:
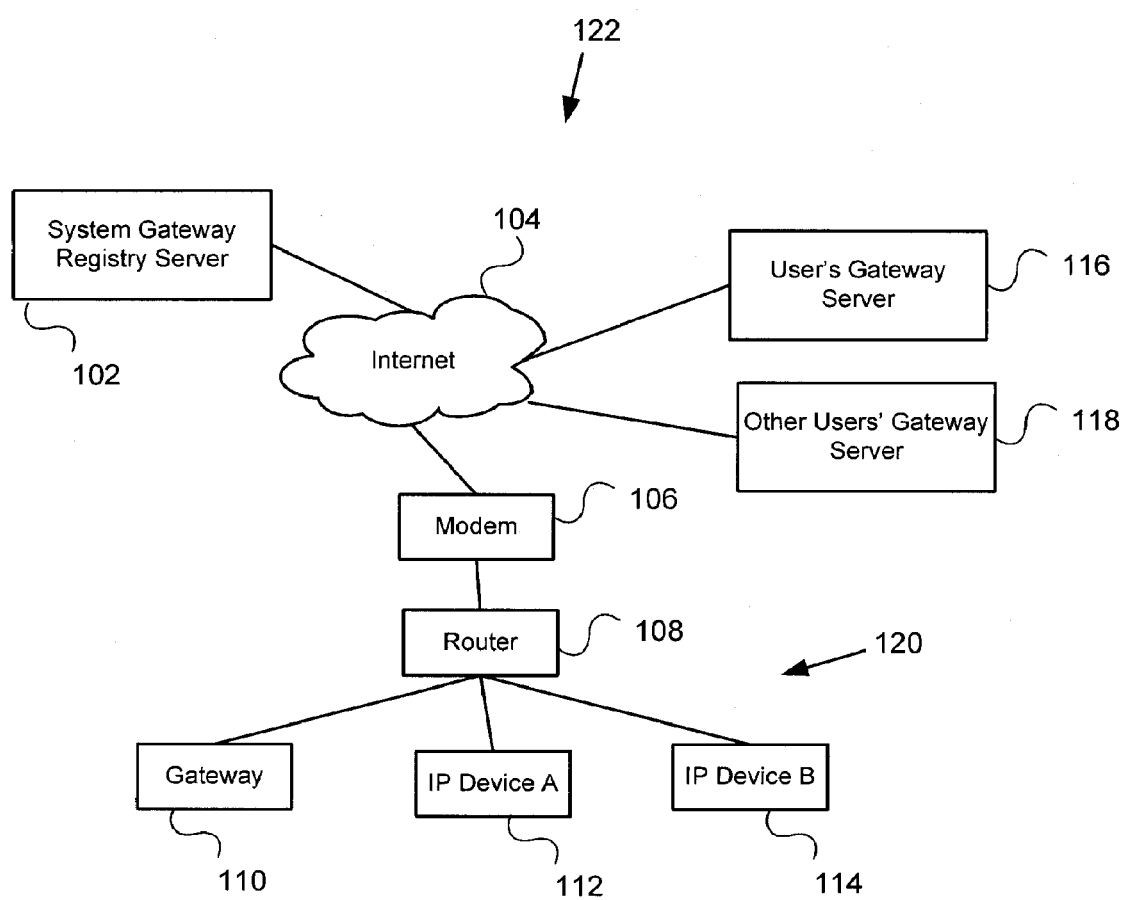
FIG. 1 is a block diagram of a system for managing control networks including a control network including a gateway, according to an embodiment.

In some embodiments, the system gateway devices connect to servers (gateway servers) that contain the account information for the user of the system. The gateway itself does not necessarily know what server the account is on, and thus determines, is shown, or is told which server contains the account to manage the account remotely. The methods, systems, and devices provided herein make use of a gateway registry. The gateway registry communicates to the gateway the location of the server containing the account of the account associated with the gateway. The location may comprise, for example, the address of the server. A depiction of an embodiment of a gateway registry system is provided in FIG. 1. FIG. 1 is a block diagram of a system 122 for managing control networks including a control network 120 including a gateway 110, according to an embodiment. FIG. 1 shows IP devices 112, 114 connected to router 108, a gateway 110 connected to IP devices 112, 114 through router 108 and connected through the router 108, through modem 106, and through Internet 104 to a central repository (the gateway registry 102), two gateway servers 116, 118 (user's gateway server 116 and another gateway server containing other users' accounts 118), connected through Internet 104, modem 106 and router 108 to gateway 110.

Once the gateway server location is determined, and the gateway server is contacted, the gateway, in some embodiments, is validated by the gateway server in order for the gateway to gain access to the user account. Once this is done by the methods provided herein, and/or using the devices and/or systems provided herein, in order to manage the account, the gateway downloads the configuration for that account, wherein the configuration is in the account on the gateway server, and/or the gateway uploads data to the account from the premises in which it is installed.

In some embodiments, the configuration may be adjusted from a location remote to the premises where the local network that the gateway manages is located. In other embodiments, the configuration may be adjusted from the location of the premises where the local network that the gateway manages is located. In yet other embodiments, the configuration may be adjusted from either or both the location of the premises and/or from a remote location to the premises where the local network that the gateway manages is located.

Figure 2:
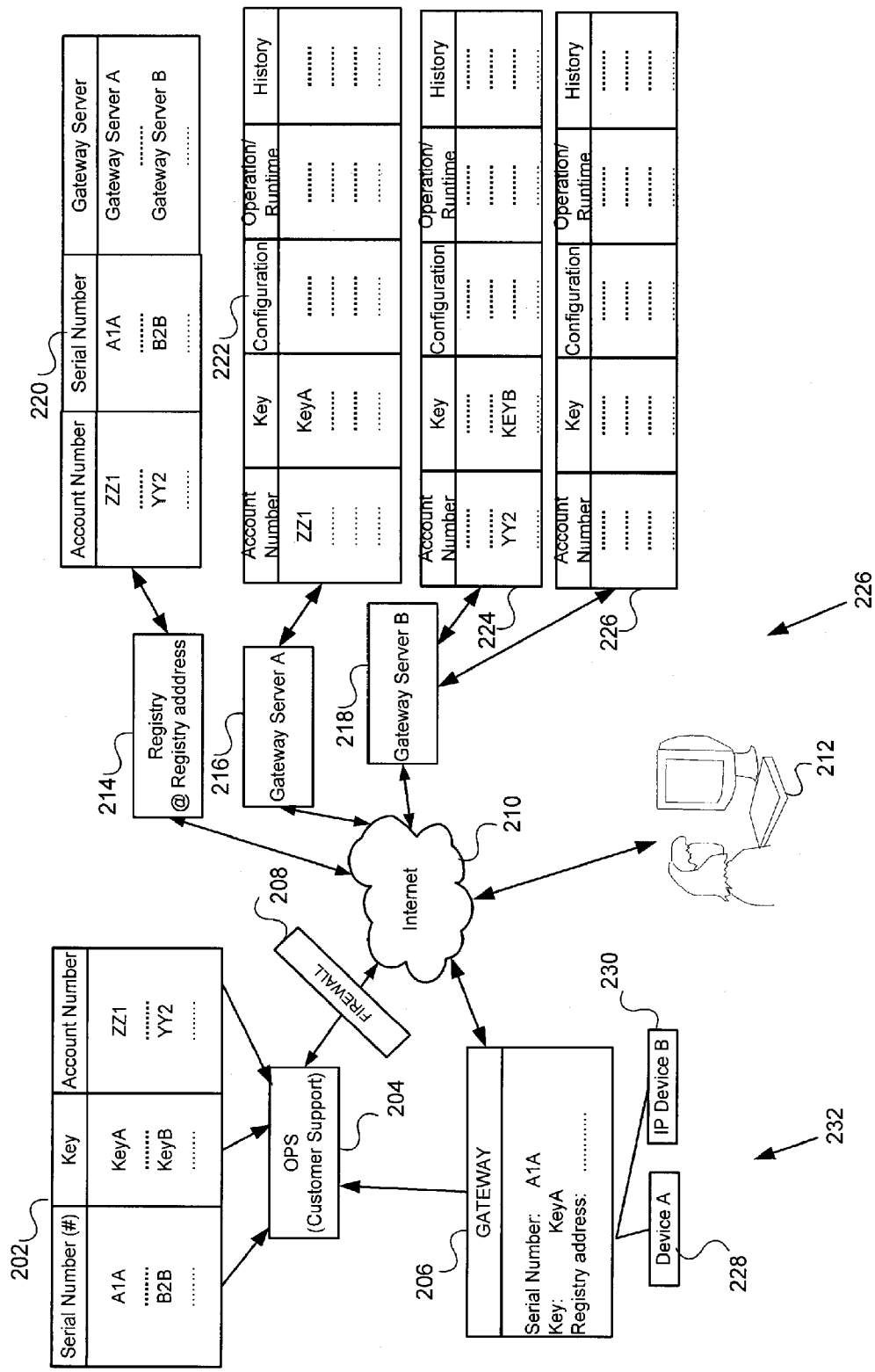
FIG. 2 is a block diagram of a system for managing a set of control networks with gateway devices including a set of gateway servers, according to an embodiment.

For example, FIG. 2 is a block diagram of a system 226 for managing a set of control networks (for example, control network 232) with gateway devices (for example, Device A 228, IP device B 230) including a set of gateway servers 216, 218, according to an embodiment. FIG. 2 depicts a user at a computer 212 connected to Internet 210. Further depicted is a gateway device 206 comprising the serial number (serial #) of the gateway, which may be its MAC id or its Ethernet address, a key for the gateway, which may be installed by the manufacturer of the gateway, and the address of the registry, which may be a Uniform Resource Locator (URL) address for the registry server 214. In the embodiment depicted in FIG. 2, operational server (OPS) 204 is connected to database 202 (which may be called a master database or a table) which contains the serial numbers, keys and account identifications (which may be called account numbers) associated with gateways. OPS 204 is coupled to Internet 210 through a secure connection including firewall 208. Master database 202 can be used to communicate to gateway registry 214 the serial number of the gateway 206, the account number (or account identification) associated with the gateway, and/or the server address of the account associated with the gateway. Master database 202 can be used to communicate to the gateway server account information associated with the gateway, the gateway account number, and/or the key associated with the gateway. Gateway registry 214 of the embodiment depicted in FIG. 2, is coupled to Internet 210, and comprises a table 220 comprising the account number and gateway servers associated with gateways serial numbers. The table 220 of the Gateway registry 214 of the embodiment depicted in FIG. 2 also comprises the addresses and/or information about which gateway servers 216, 218 connected to Internet 210 host the accounts associated with gateway account numbers and keys (which are associated with a gateway 206). The Gateway servers 216, 218 comprise tables 222, 224, 226 which contain account information associated with gateways (for example, gateway 206). The account information in a table (for example table 222) can be, for example, the account number of a gateway 206, the key associated with a gateway 206, configuration for devices 228, 230 associated with a gateway 206, operation time or run time associated with a gateway 206 or control network 232, and history of the gateway 206, devices 228, 230 associated with the gateway 206 and/or the control network 232, or the control network in general 232. There may be several gateway servers, 216, 218, and there may be multiple tables (for example tables 224, 226) associated with a server (for example server 218). Typically, an account associated with a gateway (for example gateway 206) is located in a single table (for example table 222) on a single server (for example server 216). However, other arrangements are contemplated and described herein.

The keys may be protected and controlled such that only authorized devices, systems, and/or users may access the keys. The keys may be encrypted when transferred over an un-secure connection or a secure connection. The keys may be protected by a firewall. The accounts on the servers may, in some embodiments, comprise account configurations, operation time and/or run time information, and/or account history information.

The embodiment of FIG. 2 also shows example connections to and between each of the elements shown through which communication can be passed as described herein. The connections shown in FIG. 2 need not be physical connections, and elements and devices shown connected in FIG. 2 may be coupled together in another manner, such as through another device, or wirelessly, for non-limiting examples.

Provided herein are methods and systems by which a gateway can discover the server that hosts the user's account. Provided herein are gateway devices and/or systems which can discover the server that hosted the user's account.

Each gateway device contains a unique hardware address for its Ethernet connection. Ethernet devices have unique addresses, also called gateway device Ethernet addresses. The Ethernet address of a gateway device may be used as a unique serial number, or another combination of numbers and letters may be used as the unique serial number for a particular gateway. In some embodiments, the gateway stores the unique hardware address for initialization of the gateway device. At production time, or thereafter, a unique key is placed in, and stored in, the gateway device. Both the unique address and the unique key are also stored in a master database for subsequent linking to an account once the gateway is associated to an account, and/or for subsequent populating of a gateway registry table and/or subsequent populating of a gateway server table. The master database may be securely controlled with various levels of access allowed to authorized personnel only, for example, such as customer service personnel managing the master database. The master database may be protected by a firewall device (a firewall).

According to some embodiments, a central repository contains all known account numbers and the gateway unique numbers associated with the accounts. The location of the central repository is also stored by the gateway. In some embodiments the central repository is a gateway registry and/or gateway registry server of all known accounts and gateways. The gateway registry may also be populated with the gateway server information which may be known within the master database. Alternatively, the gateway server information may be known by a third party controlling the gateway server who communicates the server information to the registry directly, and the registry then records the server address associated with a particular account. In another embodiment, the gateway server information may be known by a third party controlling the gateway server who communicates the server information to the master database, directly or indirectly, and the master database then populates the registry with the server information associated with the account.

Figure 3:
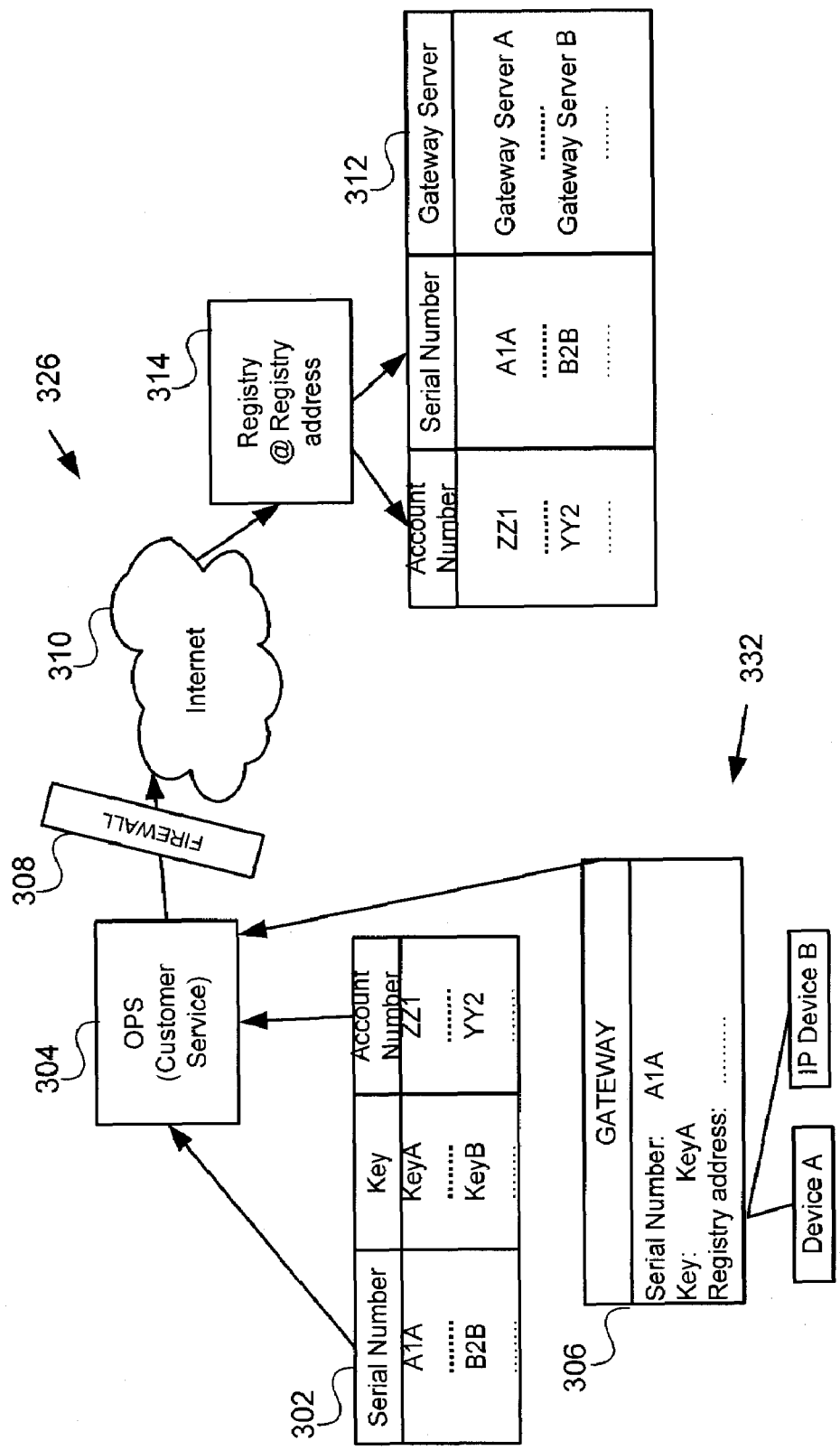
FIG. 3 is a block diagram of a system for managing control networks showing management of keys, serial numbers and account numbers, according to an embodiment.

In some embodiments, the central repository (gateway registry) is populated using a secure connection to the Internet (firewall protected) with the account number associated with the gateway device and the serial number of the gateway associated with the account number and system FIG. 3 is a block diagram of a system 326 for managing control networks (for example control network 332) showing management of keys, serial numbers and account numbers, according to an embodiment. Shown in FIG. 3 are couplings between and information within and passed between gateway device 306, operational server master database 302, and gateway registry 314. In the embodiment of FIG. 3, the operational server (OPS) 304 and/or a customer service entity, upon association of a gateway device 306 to an account, populates a master database 302 with the account identification (which may be an account number) associated with the gateway device 306, the serial number of the gateway 306 associated with the account identification, and the key associated with the gateway 306. Operational server (OPS) 304 and/or a customer service entity, as shown in FIG. 3, may also populate a table 312 of the gateway registry 314 using a secure coupling to Internet 310 (firewall 308 protected) with the account identification associated with the gateway device 306 and the serial number of the gateway 306 associated with the account identification.

According to some embodiments, upon association of a gateway device to an account (which is identified by the account identification, or account number), the gateway server may be populated with the account identification (or account number) associated with the gateway device and the key associated with the gateway device through use of the operational server (OPS) and/or a customer service entity. The master database of the OPS may provide the account identification associated with the gateway device, and/or the key of the gateway device to the gateway server.

In order to find the proper server to populate as described, in some embodiments, identification of the server that contains the account associated with the gateway device is performed by the OPS when the account identification and unique address is populated in the gateway registry. In some embodiments, the server information is temporarily stored in the master database, or temporarily stored by the OPS a sufficient amount of time to populate the server with the key associated with the gateway and the account number associated with the gateway device. In some embodiments, the server information is stored permanently in the master database when the gateway registry is populated by the master database. In some embodiments, the server is designated by the OPS. In some embodiments a third party or system that can manage the server and may or may not manage accounts on the server designates the server for an account.

In some embodiments, the gateway server information may be known by a third party controlling the gateway server who communicates the server information to the registry directly, and the registry then records the server address associated with a particular account. In another embodiment, the gateway server information may be known by a third party controlling the gateway server who communicates the server information to the master database, directly or indirectly, and the master database then populates the registry with the server information associated with the account.

Figure 4:
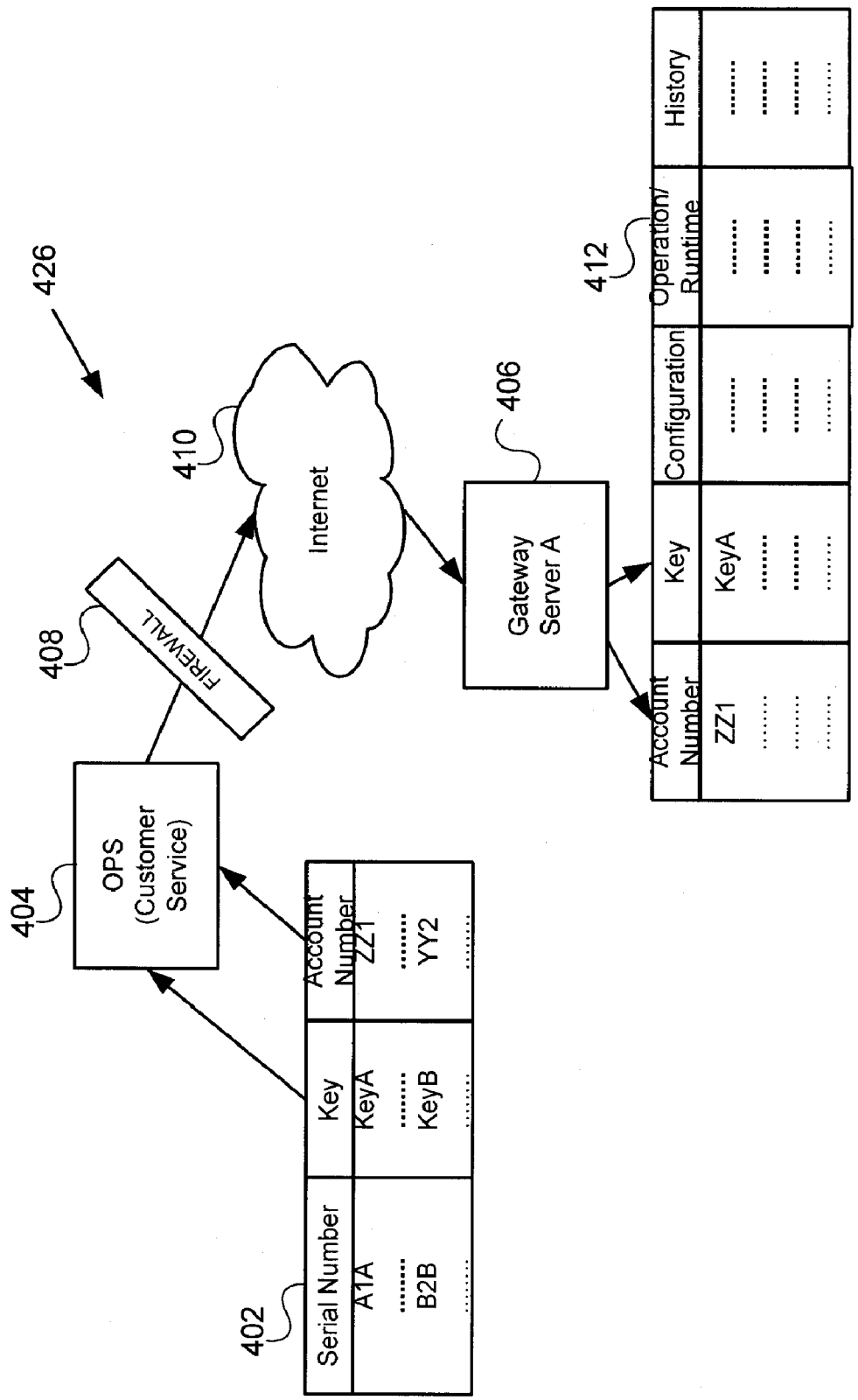
FIG. 4 is a block diagram of a system for managing control networks showing storage of account information, according to an embodiment.

For example, FIG. 4 is a block diagram of a system 426 for managing control networks (not shown) showing storage of account information, according to an embodiment. FIG. 4 depicts couplings between, and information within and passed between, operational server master database 402 and gateway server 406 using a method wherein operational server (OPS) 404 and/or a customer service entity uses master database 402 to populate a table 412 of a gateway server 406 using a secure connection to Internet 410 (firewall 408 protected) with the account identification (account number) associated with the gateway device, and with the key associated with the gateway device.

The central repository, in some embodiments a gateway registry and/or gateway registry server, of all known accounts and gateways is used to find which gateway server, called the account server and/or the gateway server, in some embodiments, holds the account information associated with the gateway (see, for non-limiting example, FIGS. 1 and 2). While there may be several gateway registries existing, a gateway device knows only an address for, or location of, the gateway registry which contains its gateway unique address, account identification, and the gateway server address (or location), for the gateway server holding the account associated with the gateway device. In some embodiments, the gateway registry, registries, the gateway server, and/or gateway servers, are in different physical locations, and/or within different pieces of hardware. In some embodiments, the gateway registry, registries, the gateway server, and/or gateway servers, are conceptual locations, and/or logical constructs within a single piece of hardware. Various combinations of conceptual locations, logical constructs, physical locations, and different pieces of hardware are also contemplated herein for the gateway registry, registries, the gateway server, and/or gateway servers in some embodiments.

At power-on, the gateway device initializes, and sends a request to the central repository (for example, the gateway registry) specifying only the gateway unique address, for example a serial number for the gateway or the Ethernet address for the gateway. In some embodiments, the serial number for the gateway is the Ethernet address for the gateway. This address is then used to look up the user account associated with the gateway unique address, and respond back to the gateway device with the location of the server that it is to use to find the account associated with the gateway device. The gateway server at such location provided comprises the account associated with the gateway device which requested the information from the gateway registry. In some embodiments, the user account looked up is the account number associated with the unique address provided to the registry server. In other embodiments, the user account looked up is the account identification associated with the unique address provided to the registry server. The gateway server address received and the user account looked up are not sensitive, in that they are not, in and of themselves, sufficient to access the gateway server (as described herein), or to access the account on the gateway server associated with the gateway for which the unique address was provided.

Figure 5:
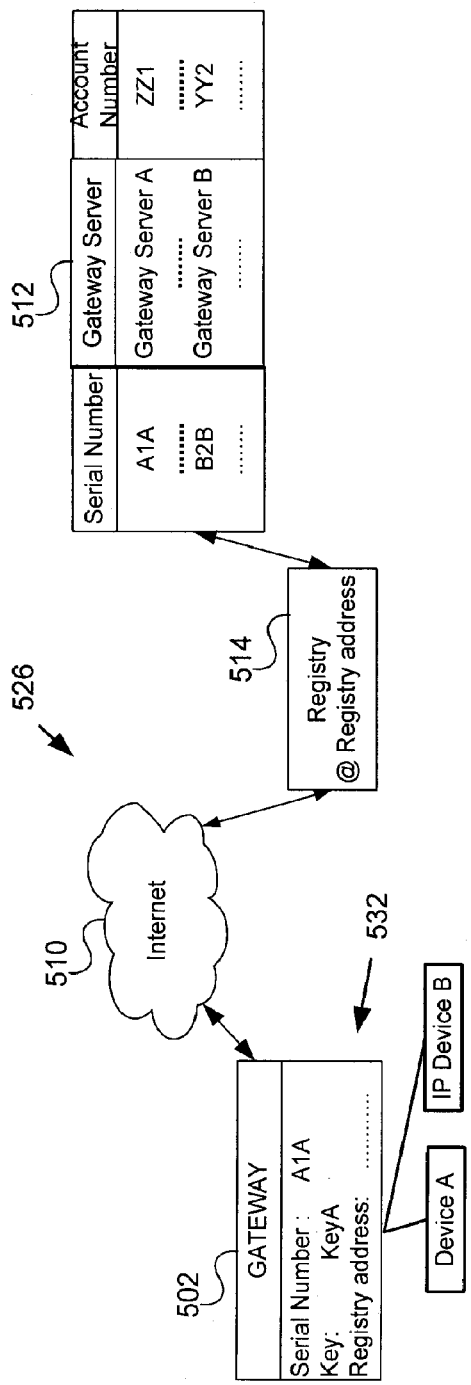
FIG. 5 is a block diagram of a system for managing control networks showing initialization of a gateway device, according to an embodiment.

For example, FIG. 5 is a block diagram of a system 526 for managing control networks (for example, control network 532) showing initialization of a gateway device 502, according to an embodiment. FIG. 5 is a block diagram depicting couplings between and information within a gateway device 502 and a gateway registry 514 used to execute a method of determining where the account associated with the gateway device 502 is located, and to determine the account number associated with the gateway 502. In the embodiment shown in FIG. 5, gateway 502 initializes, and sends a request to gateway registry 514 at the registry address stored in gateway memory, for example, in a table 512 of the registry 514. The request to the registry specifies the serial number for the gateway stored in the table 512. In the FIG. 5 embodiment, the serial number is used to look up the user account number associated with the gateway serial number, and the location of the server that contains the account associated with the gateway serial number. The registry 514 responds back to the gateway 502 with the account number (or account identification, in some embodiments) and location of the server that contains the account associated with the gateway. The gateway 502 stores the account number and the server location in its memory, in some embodiments.

At production time, in some embodiments, a unique key is placed in, and stored in, the gateway device. This key is then recorded by another repository, in some embodiments, the Operational Server, OPS, and/or a Customer Support Server. The key may be recorded as a key/value pair with the unique address of the device. The key may be the basis of an authentication that is used to validate that the gateway is the gateway for the user's account in order to access the account on the gateway server. In some embodiments, this key is used with a cryptographic hash to authenticate that the gateway is the correct gateway for the user's account. In some embodiments, this key is used with a cryptographic hash to create the authentication that the gateway is the correct gateway for the user's account. In some embodiments, this key is stored in the gateway device and the account identification looked up and received by the gateway from the gateway registry is used with a cryptographic hash to create the authentication that the gateway is the correct gateway for the user's account.

Figure 6:
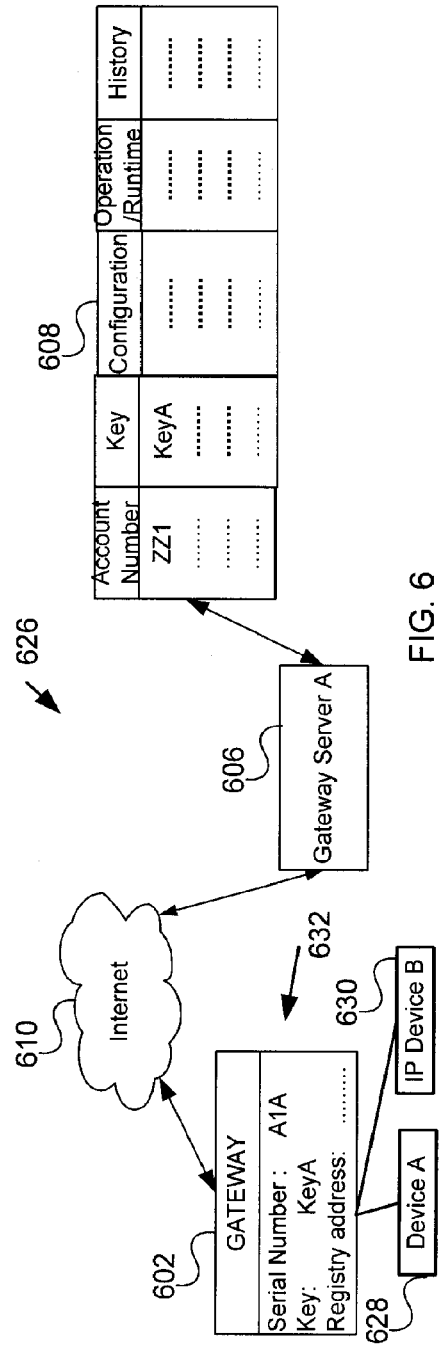
FIG. 6 is a block diagram of a system for managing control networks showing communication of a control network including a gateway device and a gateway server, according to an embodiment.

For example, FIG. 6 is a block diagram of a system 626 for managing control networks (for example control network 626) showing communication of a control network 626 including a gateway device 602 and a gateway server 606, according to an embodiment. FIG. 6 depicts a block diagram representation of an embodiment of the invention depicting couplings between and information within gateway device 602 and gateway server 606 used to execute methods for managing an account on the server 606 associated with the gateway device 602 and local management devices 628, 630 on a local network 632 located at a location remote from the server 606. In the embodiment shown in FIG. 6, once gateway device 602 is communicated to with the location of the server 606 upon which the account resides associated with the gateway device 602 (i.e. hosting the account associated with the gateway device) and the account number (or account identification) associated with the gateway device 602, the gateway device 602 sends an authentication based on the key stored in the gateway 602 and the account number (or account identification) stored in the gateway 602 to the server location of the server 606 hosting the account associated with the gateway 602. If the authentication provided to server 606 by gateway 602 matches a server-generated authentication based on the key associated with the account number stored in memory server 608, the gateway device 602 is allowed to access and manage the account associated with the gateway device on the server. This method, and devices and systems adapted to carry out this method validates that the gateway 602 is genuine, and not being impersonated by another device not authorized to manage or control the local network of devices 628, 630 associated with the gateway 602.

In some embodiments, the unique address to user account mapping is separate from the gateway key to user account mapping. In the first mapping, the gateway device uses the gateway serial number stored within the gateway device and the gateway registry location to contact the gateway registry in order to receive the location of the registry server and the account identification for the account associated with the gateway device. In the second mapping, the gateway device uses the location received from the registry to contact the gateway server and then uses the key stored on the gateway device and the account identification received from the registry as the bases for an authentication that unlocks the account associated with the gateway device to the gateway device.

Once the first mapping has occurred, in some embodiments, the gateway stores the location of the registry server and the account identification received by the registry in temporary memory which can be accessed so long as the gateway is not powered-off and/or does not lose power. In some embodiments, once the first mapping has occurred, the gateway stores the location of the registry server and the account identification received by the registry in permanent memory and is accessible by the gateway regardless of whether the gateway loses power or is powered-off.

Once a gateway server has been identified by a gateway device, and the gateway server has validated that the gateway is genuine per the methods and by devices and systems described herein, the network of local management devices coupled to the gateway at the location can be remotely managed from a location remote to the location of the gateway device and location management devices by viewing the account on the server through, for example, a remote network such as the Internet.

Figure 7:
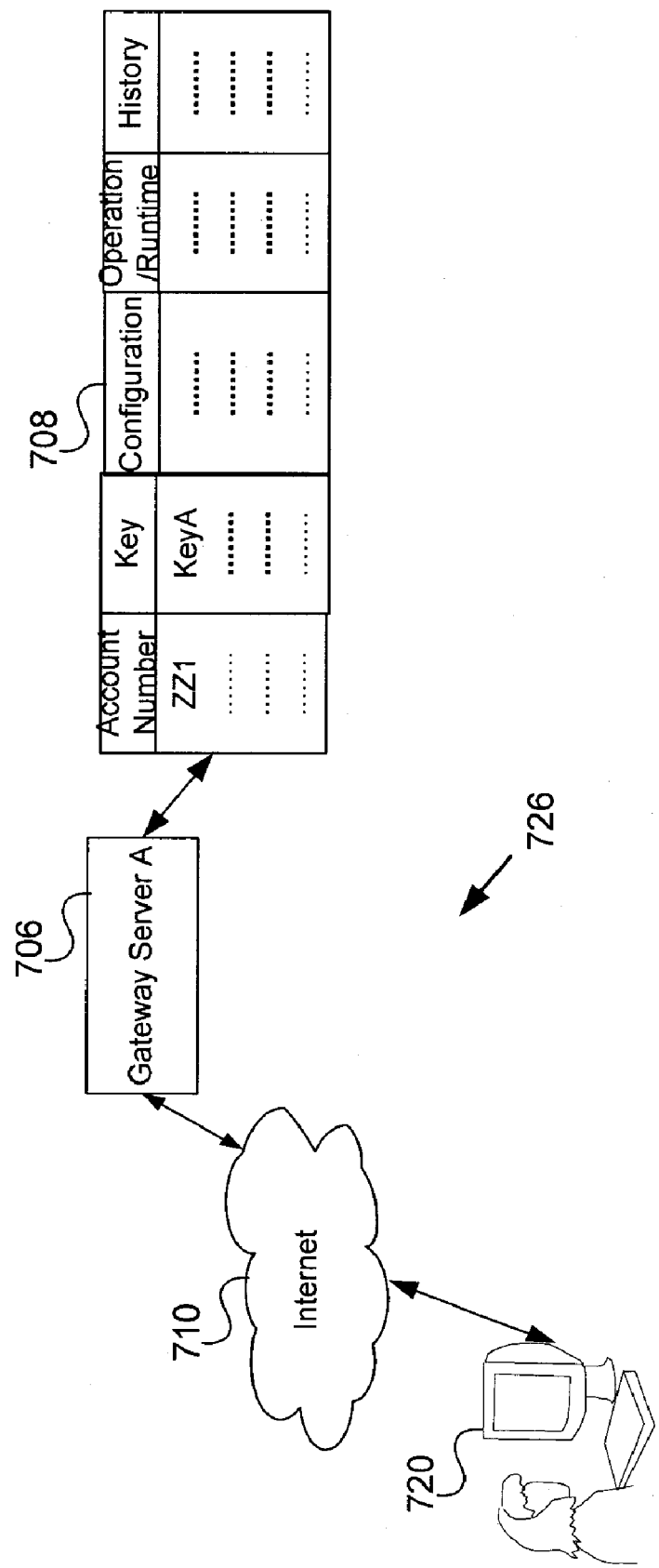
FIG. 7 is a block diagram of a system for managing control networks showing management of a control network, according to an embodiment.

For example, FIG. 7 is a block diagram of a system 726 for managing control networks (not shown) showing management of a control network (not shown), according to an embodiment. FIG. 7 depicts couplings between a remote management device 720 capable of managing a network (not shown) of local management devices at a location remote from the remote management device 720. In such embodiment, the remote management device 720 couples (through, for example, Internet 710) to gateway server 706 containing a table 708 containing account information for the network of local management devices (not shown) associated with the gateway device (not shown) and with the account information in the table 708 on the gateway server 706. The remote management device 720 thus may be used to manage and control the account information on the server 706, which, as shown in FIG. 6 couples with the gateway device 602 at the location which couples to the local management devices 628, 630 at the location. A user of the remote management device 720, which may be a computer, PDA, cellular phone, or another device coupled to the Internet wirelessly or wired, may, for example, change configuration data in the table 708 of the server 706, wherein the configuration data shows the current status of a device on the local network connected to the gateway associated with the account, such as the temperature in a particular room, or view the output of a camera in a child's room, or view the inside of a vault, or turn on a light, or unlock a door, or any combination of these and other activities. Other types of devices are provided and contemplated herein, any of which could be managed using the system, devices, and methods described herein.

Figure 8:
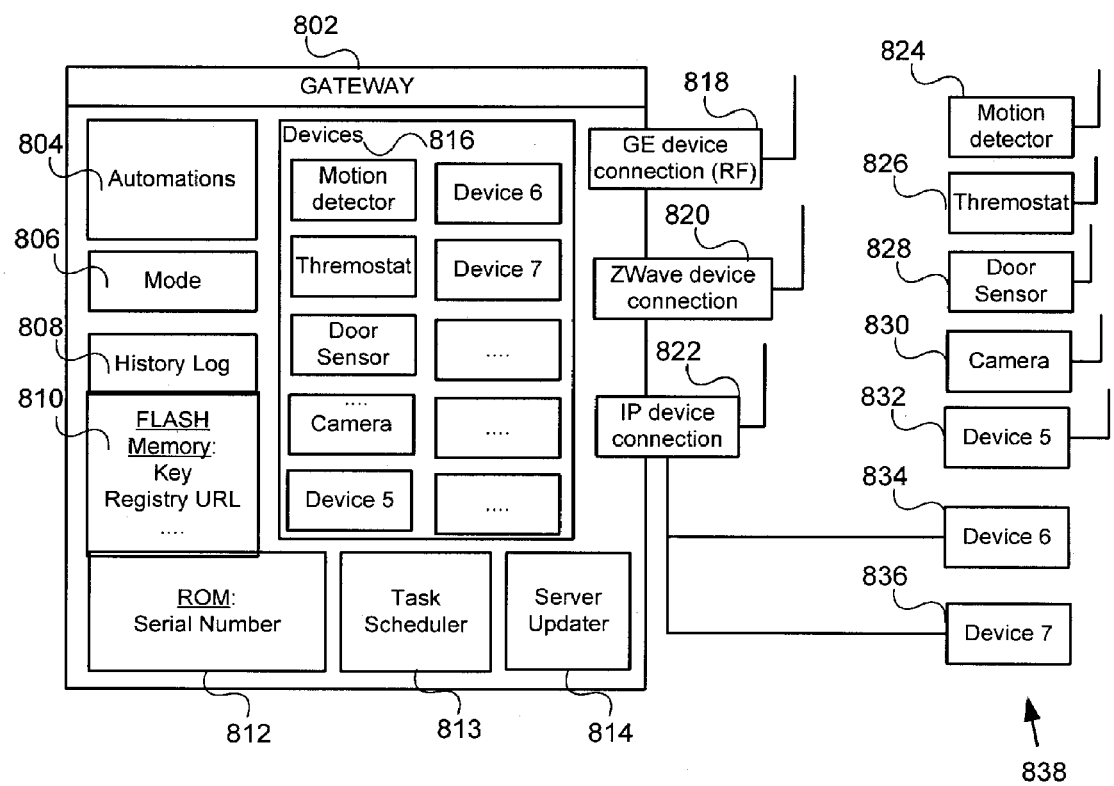
FIG. 8 is a block diagram of a gateway device and showing location management devices, according to an embodiment.

FIG. 8 is a block diagram of a gateway device 802 and showing location management devices 824, 826, 828, 830, 832, 834, 836, according to an embodiment. FIG. 8 shows an embodiment of a gateway device 802 coupled to a set 838 of network devices at a location. The gateway device embodiment shown in FIG. 8 is a block diagram depicting logical representations for each of the elements within the gateway device 802, and a block representation of multiple local management devices 824, 826, 828, 830, 832, 834, 836 at the location which the gateway device 802 can manage and control. In the embodiment shown, gateway device 802 comprises logic 816 for managing which, for non-limiting example, can include monitoring and controlling, a set of local management devices 838 connected to a local network located at the location. The gateway device 802, in some embodiments, is also located at the location and connected to the local network. The logic of the embodiment shown in FIG. 8 comprises, for non-limiting example, automations 804, mode 806, task scheduler 813, and server updater 814. The gateway device of this embodiment comprises an interface that allows connectivity to a remote network over which the gateway can communicate to remote systems which are remote to the location. Such remote systems may include a gateway server, a gateway registry, an operational server, a remote management device, as provided herein. The gateway device may also have an interface for communication to at least one local management device (for example, local management devices 824, 826, 828, 830, 832, 834, 836), a processor (not shown), memory 810, 812, an address of a gateway registry (in this case, a URL, although other addresses are contemplated), a serial number of the gateway, and a key.

Although not shown, the gateway device 802 of the embodiment of FIG. 8 comprises logic that, upon initialization of the gateway uses the address of the gateway registry to communicate with the gateway registry, sends a request to the gateway registry specifying the serial number of the gateway, receives a response with an address of the server upon which an account associated with the gateway is stored, and receives a response with an identification of an account for managing the location associated with the gateway; and logic that communicates with the server upon which the account associated with the gateway is stored by using the identification and authentication information derived based on the key.

In the embodiment shown in FIG. 8, devices 824, 826, 828, 830, 832, 834, 836 on the network that the gateway 802 can manage and control include, as non-limiting examples, a motion detector 824, a thermostat 826, a door sensor 828, a camera 830, and other local management devices (for non-limiting example, devices 832, 834, 836). The gateway 802 is shown having conceptual placeholders 816 for devices (not the actual devices) within it. These conceptual placeholders 816 may, in some embodiments, store the settings, software, logic, and hardware for controlling and managing the actual devices which are external to the gateway at the location. The embodiment gateway in FIG. 8 can communicate to the devices by RF 818, Z-wave 820, and/or IP 822, as non-limiting examples. In other embodiments, the gateway 802 can communicate to local management devices by any other communication means, including by wired and wireless means.

When the configuration data on the server is changed, the gateway which contains settings for each local management device at the location connected to it, can update its settings to conform to the server configuration by contacting the server and validating that it is the genuine gateway associated with the account stored in its memory, as described herein, and accessing and downloading the configuration settings or the changed configuration settings on the server for the account.

Provided herein is a method, system, and device wherein an account may be moved from server to server as needs change (moving data-centers, etc.) without having to update the gateway devices out in the field that the server has changed. The gateway can communicate with the central repository to find the new server location by executing the method done when initializing. For example, when the gateway server containing the account associated with a particular gateway is moved, the gateway which has already executed the first mapping will not be able to access its account using the server location stored in its memory. When the gateway contacts the gateway server at the location it previously received from the gateway registry, it receives an error message or a non-response from the gateway server, since there is no account identification on the gateway server matching the account identification provided by the gateway device. When such error or non-response is detected by the gateway, the gateway can re-initialize (repeat the first mapping), determine the new server location and re-receive the account identification from the gateway registry, per the methods and using the devices described herein.

Provided herein is a method and system wherein the account associated with the gateway device (called the previous gateway device) may be associated with a new gateway device. The new gateway can be associated with an existing account on a server by first updating the master database with the new gateway serial number and new gateway key, and by associating the new key and new serial number with the account identification formerly associated with the previous gateway device. The gateway registry may then be updated by using methods and systems described herein to populate the gateway registry table with the new gateway serial number and associating the new gateway serial number with the server address associated with the previous gateway device. The gateway server may then be updated by using methods and systems described herein to populate the gateway server table with the new gateway key and associating the new gateway key with the server address associated with the previous gateway device and associating the new key with the account identification associated with the previous gateway device. Once the gateway registry and the gateway server are updated to be associated with the new gateway device, upon initialization of the new gateway (such as upon powering-on), the new gateway device can use embodiments of the methods and systems provided herein to allow remote (and/or local) management of the local management devices to which it couples. It is contemplated that a new gateway device, which is also a gateway device, may comprise the various embodiments of the gateway device as described herein.

An embodiment allows the gateway to not have to (although it may) store any user account information other than its gateway serial number, logic to communicate with the devices to which it is connected based on account information received from the gateway server, memory, a processor, interfaces to the local network of local management devices and to the local management devices that the gateway manages, interface to systems on a network remote to the location of the local management devices that the gateway manages, and logic to carry out the mappings as described herein. In some embodiments, the systems comprise the gateway registry, and the gateway server. In some embodiments, the gateway stores history of the devices on the network managed by the gateway and/or history of the gateway.

The authentication provided by the gateway to the gateway server to access the account associated with the gateway may comprise a cryptographic hash of the key stored in the gateway. The authentication matches identical information stored on the gateway server, and allows the gateway server to ensure that the gateway device is genuine, and is not in fact another device/computer trying to masquerade as the user's gateway device.

The separately stored mappings between the account identification and the key, and the account serial number and the account identification of the gateway is a security measure to ensure that it is more difficult to break into either the gateway registry or the gateway server and discover the key and account identification pair, both of which may be used to operate correctly as the gateway.

For example, an embodiment of the invention comprises any of the above systems or methods alone or in combination as part of a network for premises management. The network may include premises management devices such as a smart thermostat. The premises management devices are connected to a premises network which can be, for example, an RF and/or power line network. The premises network is connected to a gateway which in turn is connected to a broadband device such as a DSL, cable, or T1 line. The gateway can alternatively or also be connected to a dial up modem. The premises is connected to the Internet according to an embodiment. The Internet is connected to system managers at the network operations center. The Internet is also connected to customers of the system manager, for example vendors such as premises vendors, communication service vendors, or Internet portal vendors. The Internet is also connected to vendees, such as premises vendees, communication service vendees, or Internet portal vendees.

An embodiment may include programmable code and devices with screens of a portal interface for premises management. For example, code with may summarize premises management services. Code may summarize security management services and safety management services. Code may also summarize energy management services. Services offered by the system can be branded and incorporated into a third part web portal, for example, in a personal portal such as one provided by Yahoo.

The look and feel of the system pane can be tailored by the service provider.

In an embodiment, a system portal summary page may show a snap-shot of the state of the various devices in the user premises. For example, in an embodiment, the user can change premises by clicking on this box and selecting a different premises. A status pane may list the different devices in the user premises along with their actual states. A pending updates pane may show the time of the last communication between the premises and the server as well as any pending updates waiting to be sent downlink to the premises. The pictures pane shows the last several (e.g., last four) pictures taken by the camera in the user premises. The user can click on a thumbnail picture to look at a larger version of the photo as well as access archived images for that camera, look at live video, take new pictures or delete photos. The schedule pane shows the scheduled activities for the premises. The alarm history shows an archive of the most recent event and activity in the user premises. The reminders pane provides a means for the system to remind the user to perform certain activities or functions related to their home or business. The mode drop down button on the respective navigation bar allows the user to switch between the systems modes. The QuikControl drop down allows the user to control any device that is controllable (e.g., camera, thermostat, lamps, etc.).

According to an embodiment, a method is provided for premises management networking. Premises management devices connected to a gateway at a premises are monitored and controlled. According to an embodiment, an uplink-initiation signal associated with a network operations center server is received at the premises. In response to the uplink-initiation signal, communications between the gateway and the network operations center server may be initiated from the gateway at the premises. During the communications between the gateway and the network operations center server, information associated with the premises management devices may be communicated.

The premises gateway can be a low-cost and standalone unit that connects the in-premises devices to the server. The connectivity to the Internet can be accomplished via a broadband connection (Digital Signal 1 (T1), Digital Subscriber Line (DSL) or cable) and/or via the telephone line. Though broadband connectivity may be used, telephone connectivity may be present as a back-up option in case the broadband connection is lost. For premises without a broadband connection (e.g., vacation homes) a telephone-only connection can be used.

A user account may be established by the end user using personal information (name, payment option, etc.) of the user. The account registration may involve the user logging on to the system manager web site and establishing a new account by entering name, address, phone number, payment details and/or the gateway serial number printed on the gateway in the end user's possession. In some cases the system manager service account may already be pre-established with the gateway serial number and the end user simply has to update the account with personal and payment information. Multiple gateways can also be handled per user account.

The gateway may be registered to associate the user account on the system manager server (established in the previous step) with an actual gateway in the user's home. The gateway is connected to a broadband network or the telephone line in the home.

An embodiment may help provide users with a hosted and managed service for premises device monitoring and control for a fee, such as a monthly subscription fee. The premises markets include residential homes, commercial multiple tenant units (MTUs) as well as small businesses.

Embodiments may provide device logging, activity logging and tracking. For example, an embodiment can log any device variable specified by the user for up to, for example, 30 days. The user defines a logging interval for each variable at the time of configuration. The logging feature can be handled by the gateway on the local device side and the data can be transferred to the server at regular intervals. The overall variable log for all variables can be kept on the server side. Logging of data for more than, for example, 30 days (but no more than, for example, 180 days) can be provided to the user, for example for a nominal fee. An embodiment may provide at least, for example, a 14-day history log of all user, system and device actions. An action includes a change to a device variable, system or network settings brought on by either the system or the user (e.g., variable changed, logging enabled, device added, user notified, etc.). The user can trace back system activities to their cause and to the date and time they occurred. Past activities can be searched by variable, device, category or date.

An embodiment can support user-defined modes, such as "home," "away," "sleep," "vacation," etc. The mode the user network is in plays a factor in the determination of the actions taken (reporting, alarming, eventing, notification, etc.) by the system when variable changes occur. According to an embodiment, the user can specify alarm conditions for variables with discrete states (e.g., binary ON/OFF). These alarms can be reported in real-time (i.e., immediate uplink) by the gateway to the server. The server then in turn looks at the data and determines, based on user alarm settings, whether to notify the user or not.

According to an embodiment, for non-critical events, the system can notify the user in non-real-time fashion regarding the state of any variable specified by the user. The variables chosen for user eventing can be of any kind (discrete or continuous). The gateway updates the server with the change of variable state/value at a regularly scheduled upload. The server continuously looks at variable data and determines, based on user eventing settings, whether to notify the user or not. Eventing conditions can be determined based on the value or state of a variable as well as the system mode. According to an embodiment, the system can support user alarming and eventing via the following methods: email, text messaging, pager, and/or voice telephone call (voice synthesis).

An embodiment may provide device data monitoring and control. The user can specify any device variable for monitoring and control via the server portal. For example, up to 255 devices can be supported by a single gateway. For example, up to 512 variables can be supported by a single gateway.

The system can support an open architecture where most, if not all device networking protocols can be supported. Examples of specific device protocols supported by the system include RF and powerline protocols, such as GE Interlogix RF and Echelon LonWorks power line (PL & FT), simplifying the installation burden by requiring no new wires to be installed in a premises. The LonWorks free topology twisted pair medium (FT-10) can be supported as an option to support certain commercial applications (e.g., office buildings).

The following is a non-exhaustive list of a few other devices supported by the system.
  1. Small data/message display—for text messages, news, weather, stock, photos, etc.
  2. Door latch control
  3. Pool/spa control
  4. Weather station
  5. Lighting control
  6. Elderly or disabled monitoring
  7. Irrigation controller (Bibija)
  8. VCR programming The system can support cameras. For example, standard off-the-shelf IP cameras (also referred to as web cameras) may be used, such as those available from vendors such as Axis, Panasonic, Veo, D-Link, and Linksys, or other cameras manufactured for remote surveillance and monitoring. Surveillance cameras may contain a standalone web server and a unique IP address may be assigned to the camera. The user of such a camera would typically retrieve the camera image by accessing the camera's web page through a standard web browser, using the camera's IP address. In some cases the IP camera acquires a local IP address by using a Dynamic Host Configuration Protocol (DHCP) client to negotiate an address from the local DHCP server (usually residing in the user's router/firewall).

According to an embodiment, a gateway can initiate all communications with the server. Gateway communication can either initiate based on a predetermined schedule (e.g., every 30 minutes) or due to a local premises alarm (selected by the user).

Gateways can contact a common server for their first uplink connection in order to obtain their assigned gateway server address, which they can use for all subsequent uplink connections (unless changed later by the system). In the event that the gateway cannot connect to its designated gateway server, it can fall back to contacting the default initial gateway in order to refresh its gateway server address.

The predetermined call initiation schedule can be programmable by the server and can provide different intervals for broadband and telephone intervals (e.g., every 30 minutes for broadband and every 90 minutes for telephone).

An embodiment may be directed to a control network having a collection of sensor and actuator devices that are networked together. Sensor devices sense something about their surroundings and report what they sense on the network. Examples of sensor devices are door/window sensors, motion detectors, smoke detectors and remote controls.

Actuator devices receive commands over the network and then perform some physical action. Actuator devices may include light dimmers, appliance controllers, burglar alarm sirens and cameras. Some actuator devices also act as sensors, in that after they respond to a command, the result of that command is sent back over the network. For example, a light dimmer may return the value that it was set to. A camera returns an image after has been commanded to snap a picture.

In addition to the foregoing, the following are various examples of embodiments of the invention.

Some embodiments of a method for premises management networking include monitoring premises management devices connected to a gateway at a premises; controlling premises management devices connected to the gateway at the premises; receiving, at the premises, an uplink-initiation signal associated with a network operations center server; and in response to the uplink-initiation signal, initiating, from the gateway at the premises, communications between the gateway and the network operations center server; and communicating, during the communications between the gateway and the network operations center server, information associated with the premises management devices.

The uplink-initiation signal can be received via telephone and/or broadband connection. The gateway can initiate communications between the gateway and the network operations center server with at least a Hypertext Transfer Protocol (HTTP) message and/or at least an Extensible Markup language (XML) message. The premises management devices can manage energy of the premises, security of the premises, and/or safety of the premises. Many embodiments provide a hosted solution for property developers, owners and managers as well as service providers (Internet Service Providers (ISPs), telcos, utilities, etc.) such as communication service providers and Internet portal providers. Some embodiments offer a complete, turnkey, reliable, and/or cost-effective solution for the delivery of telemetry services (e.g., energy management, security, safety, access, health monitoring, messaging, etc.) to customers.

An embodiment of the invention is directed to a business method for premises management. Some embodiments of a business method for premises management include making an Internet portal available for access to a vendee, such as a premises vendee, communication service vendee, and/or an Internet portal vendee; and at least after a transaction between the vendor and the vendee, such as a premises transaction, a communication services transaction, and/or Internet portal services transaction, providing premises management services via the Internet portal to the vendee.

The Internet portal can be branded with a brand of the vendor according to an embodiment. Examples of a premises vendor include a home builder, premises builder, and premises manager. Examples of a premises vendee include a home buyer, premises buyer, and premises tenant. Examples of a communication service vendor include an Internet service provider, a telephone company, a satellite television company, and a cable television company. Examples of a communication service vendee include a customer of the Internet service provider, a customer of the telephone company, a customer of the satellite television company, and a customer of the cable television company. Premises management services can manage energy of the premises, security of the premises, and/or safety of the premises.

An embodiment of the invention is directed to a system. The system includes a network of premises management devices, a gateway coupled to the network and premises management devices, a server coupled to the gateway by a communication medium and a portal coupled to the communications medium. The portal provides communication with the premises management devices.

According to various embodiments of the invention alone or in various combinations: the communications medium may comprise the Internet; the portal may comprise an Internet portal; and/or the portal may be branded with the name of a vendor of a product associated with the premises. The product may comprise a building, and/or the vendor may comprise a party that leases the premises. The vendor may also or alternatively comprise a property management organization. The server may be included within a network operations center. The logic may comprise, according to various embodiments of the invention, software, hardware, or a combination of software and hardware.

Another embodiment to the invention is directed to a gateway. The gateway includes an interface coupled to a network of premises management devices, logic that receives data from different premises management devices, and an interface coupled to a communications medium that is coupled to a server. The server is coupled to a portal coupled to the communications medium. The portal provides communications with the premises management devices.

According to various embodiments of the invention alone or in various combinations: the communications medium may comprise the Internet; the portal may comprise an Internet to portal; and/or the portal may be branded with the name of a vendor of a product associated with the premises. The product may comprise a building; the vendor may comprise a party that leases the premises; the vendor may comprise a property management organization; and/or the server may be included within a network operations center.

Provided herein is a gateway device for managing a set of two or more local management devices at a location. The gateway device, in some embodiments, comprises a first interface that allows connectivity to a remote network over which the gateway can communicate to remote systems which are remote to the location. In some embodiments, the gateway device comprises a second interface for communication to a local network including a set of local management devices. The gateway device may also comprise a processor, memory. In some embodiments, the gateway device comprises an address of a gateway registry, a serial number of the gateway device, and a key.

In some embodiments, the gateway device comprises logic that, upon initialization of the gateway device, uses the address of the gateway registry to communicate between the gateway device and the gateway registry. In some embodiments, the logic of the gateway device sends, from the gateway device over the remote network, a request to the gateway registry specifying the serial number of the gateway device. In response to the request, in some embodiments, the logic of the gateway device receives in the gateway device, from the gateway registry over the remote network, a response including an address of a gateway server that has an account associated with the gateway device for managing the location associated with the gateway device. In some embodiments, the logic of the gateway device receives, from the gateway registry over the remote network, an identification of the account associated with the gateway device for managing the location associated with the gateway device. The logic of the gateway device, in some embodiments, communicates between the gateway device and the gateway server upon which the account associated with the gateway device is stored using authentication information derived based on the key, and communicates, over the remote network from the gateway device to the gateway server upon which the account associated with the gateway device is stored, the identification of the account that was received from the gateway registry and, in response to the communication of the identification of the account that was received from the gateway registry, receives account information from the gateway server.

The gateway device, in some embodiments, comprises logic that after initialization of the gateway device, uses the account information to manage a set of local management devices connected to a local network located at the location, wherein the gateway device is also located at the location and connected to the local network.

In some embodiments, the account stored on the gateway server includes historical data for the local network. The account stored on the gateway server may include settings for devices associated with the account. The authentication information that may be derived based on the key is derived by applying a hash function to the key. In some embodiments, the serial number of the gateway device comprises the media access control (MAC) address of the gateway device.

In some embodiments, the gateway registry is included on a first server and the gateway server is included on a second server located physically separate from the first server.

In some embodiments, the location may comprise a residence. In other embodiments, the location may comprise a business premises.

In some embodiments, the remote network comprises the Internet.

In some embodiments, the logic comprises a computer. The logic may comprise computer program code stored in a memory on the gateway device. The logic may comprise electronic circuitry included in the gateway device. In some embodiments, the logic comprises electronic circuitry and computer program code in the gateway device.

In some embodiments, the logic for managing the set of local management devices comprises automation logic that initiates actions with respect to the local management devices upon certain conditions. In some embodiments, the automation logic is configured based on account information received from the gateway server. In some embodiments, the logic for managing the set of local management devices takes actions depending on a mode.

Provided herein is a system for networks at a plurality of locations. In some embodiments, the system comprises a plurality of control networks. A control network may include a plurality of management devices at a location and a gateway device, as described herein. The gateway device in a control network may include a first interface for communicating between systems remote from the location, a second interface for communicating between at least one management device at the location, an address of a gateway registry, a serial number of the gateway device, and a key.

The system, in some embodiments, may comprise a gateway registry including serial numbers of gateway devices of the respective control networks, identifications of accounts for the control networks, and the server address of a gateway server upon which the account associated with the control network is stored. The gateway registry may comprise logic that uses the gateway serial number of the gateway device to determine the identification of the account associated with the gateway device, logic that communicates to the gateway device the determined identification of the account associated with the gateway device and the server address of the gateway server upon which the account information is stored.

In some embodiments, the system comprises a gateway server including details of the accounts for the control networks, identifications of the accounts, and keys of gateway devices in the control networks associated with the account. In some embodiments, the server includes logic that authenticates communication from respective gateway devices using the keys stored in the gateway server and authentication information received from respective gateway devices, and logic that provides account information to respective authenticated gateway devices based on identifications of accounts provided by the respective gateway devices.

In some embodiments, the account information provided by logic of the server comprises historical data for the local network. In some embodiments, the account information provided by logic of the server comprises settings for devices associated with the account. In some embodiments, the logic in the gateway server that authenticates applies a hash function to the key stored in the gateway server that is associated with the account. In some embodiments, the authentication information received from the gateway device is derived by applying the hash function to the key stored in the gateway device.

In some embodiments, the system includes a plurality of gateway servers and wherein the gateway registry includes a set of addresses to respective gateway servers and an association between gateway device and respective gateway server. In some embodiments, the gateway registry and the gateway server are comprised by a single computer system. In some embodiments, the gateway registry includes a table having an association between each gateway serial number and corresponding account number and gateway server. In some embodiments, the gateway server includes a table having an association between each gateway account identification and corresponding key.

In some embodiments, the local management devices and the gateway device are coupled by at least one of an RF, Z-wave, a wireless connection, a wired connection, and an IP connection to the local network. In some embodiments, the serial number of the gateway device comprises the media access control (MAC) address of the gateway device. In some embodiments, the gateway registry is included on a first server and the gateway server is included on a second server located physically separate from the first server.

In some embodiments of the system, the location comprises a residence. In some embodiments of the system, the location comprises a business premises. In some embodiments, the remote network comprises the Internet.

Provided herein is a method of operating a gateway device in a control network. In some embodiments, the method of operating a gateway device in a control network comprises storing on the gateway device an address of a gateway registry, a serial number of the gateway device, and a key. The method may further comprise using the address of the gateway registry to communicate between the gateway device and the gateway registry, and sending, from the gateway device over the remote network, a request to the gateway registry specifying the serial number of the gateway device.

In response to the request, in some embodiments the method comprises receiving in the gateway device, from the gateway registry over the remote network, a response including an address of a gateway server that has an account associated with the gateway device for managing a set of local management devices connected to a local network located at the location associated with the gateway device. In response to the request, in some embodiments the method comprises receiving in the gateway device, from the gateway registry over the remote network, an identification of the account associated with the gateway device for managing the location associated with the gateway device.

The method may further comprise communicating between the gateway device and the gateway server upon which the account associated with the gateway device is stored using authentication information derived based on the key. In some embodiments, the method comprises communicating, over the remote network from the gateway device to the gateway server upon which the account associated with the gateway device is stored, the identification of the account that was received from the gateway registry. In response to the communication of the identification of the account that was received from the gateway registry, in some embodiments the method comprises receiving account information from the gateway server.

The method may comprise using the account information to manage the set of local management devices connected to the local network located at the location, wherein the gateway device is also located at the location and connected to the local network.

In some embodiments of the method, the authentication information derived based on the key is derived by applying a hash function to the key. In some embodiments of the method the serial number of the gateway device comprises the media access control (MAC) address of the gateway device. In some embodiments of the method, the gateway registry is included on a first server and the gateway server is included on a second server located physically separate from the first server. In some embodiments of the method, the location comprises a residence. In some embodiments of the method, the location comprises a business premises. In some embodiments of the method, the remote network comprises the Internet.

In some embodiments, the method further comprises storing the account identification and the gateway server address in the gateway device.

Provided herein is a method for storing information to operate a gateway device in a control network. In some embodiments, the method comprises storing an identification associated with an account associated with a gateway device, a serial number associated with the gateway device, and a key associated with the gateway device in a location remote from a location of the gateway device. In some embodiments, the method comprises populating a table of a gateway registry with the serial number associated with the gateway device, a gateway server location associated with an account associated with the gateway device, and the identification associated with the gateway device, wherein the serial number, the server location, and the identification are associated with each other in the gateway registry table. In some embodiments, the method comprises populating a table of the gateway server with the identification associated with the gateway device and the key associated with the gateway device, wherein the identification and the key are associated with each other in the gateway server and wherein the identification and key are associated with the account associated with the gateway device in the gateway server.

In some embodiments of the method for storing information to operate a gateway device in a control network, the steps of storing the identification, populating the gateway registry table, and populating the gateway server table may be controlled by a gateway account manager. In some embodiments of the method for storing information to operate a gateway device in a control network, the steps of storing the identification, populating the gateway registry table, and populating the gateway server table may be controlled by a remote management device.

Provided herein is a method for storing information to operate a new gateway device in a control network, wherein the control network has been previously associated with a previous gateway device. The storing of information may be in a location remote from a location of the previous gateway device. The information to operate the new gateway device in the control network may be stored in a table of a gateway registry and in a table of a gateway server.

The method for storing information to operate a new gateway device in a control network may comprise finding an identification associated with an account associated with the previous gateway device stored in the location remote from the location of the previous gateway device. The finding may comprise looking up the identification. The finding may comprise requesting the identification. In some embodiments the location is a master database. In some embodiments, a first serial number associated with the previous gateway device and associated with a server location has been stored in a table of a gateway registry, and a first key associated with the previous gateway device has been stored in a table of a gateway server at the server location. In some embodiments, the identification associated with the account associated with the previous gateway device has been stored in the gateway registry and in the gateway server.

The method for storing information to operate a new gateway device in a control network may further comprise storing a second serial number associated with the new gateway device, and a second key associated with the new gateway device in the location remote from the location of the previous gateway device. In some embodiments, the location is the master database.

The method for storing information to operate a new gateway device in a control network may further comprise populating the table of the gateway registry with the second serial number of the new gateway device by associating the second serial number with the same identification and server location previously associated with a first serial number associated with the previous gateway device, wherein a gateway server location associated with the account associated with the previous gateway device becomes the gateway server location associated with the account associated with the new gateway device, and wherein account identification associated with the account associated with the previous gateway device becomes the gateway server location associated with the account associated with the new gateway device, and wherein the second serial number of the new gateway, the server location, and the identification are associated with each other in the gateway registry table. In some embodiments, the method for storing information to operate a new gateway device in a control network may further comprise populating a table of the gateway server with a second key associated with the new gateway device by associating the second key with the identification in the table previously associated with a first key associated with the previous gateway device, wherein the account and the identification associated with the previous gateway device becomes the account and identification associated with the new gateway device, wherein the identification and the second key are associated with each other and with the account associated with the new gateway device in the table of the gateway server.

In some embodiments, the steps of storing the identification, populating the gateway registry table, and populating the gateway server table may be controlled by a gateway account manager. In some embodiments, the steps of storing the identification, populating the gateway registry table, and populating the gateway server table may be controlled by a remote management device.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods include: microcontrollers with memory, embedded microprocessors, firmware, software, etc. Furthermore, aspects of the systems and methods may be embodied in microprocessors having software-based circuit emulation, discrete logic (sequential and combinatorial), custom devices, fuzzy (neural network) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that the various functions or processes disclosed herein may be described as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, email, etc.) over the Internet and/or other computer networks via one or more data transfer protocols (e.g., Hypertext Transfer Protocol (HTTP), File Transfer Protocol (FTP), Simple Mail Transfer Protocol (SMTP), etc.). When received within a computer system via one or more computer-readable media, such data and/or instruction-based expressions of components and/or processes under the systems and methods may be processed by a processing entity (e.g., one or more processors) within the computer system in conjunction with execution of one or more other computer programs.

Unless the context clearly requires otherwise, throughout the description and the claims, the words 'comprise,' 'comprising,' and the like are to be construed in an inclusive sense as opposed to an exclusive or exhaustive sense; that is to say, in a sense of 'including, but not limited to.' Words using the singular or plural number also include the plural or singular number respectively. Additionally, the words 'herein,' 'hereunder,' 'above,' 'below,' and words of similar import refer to this application as a whole and not to any particular portions of this application. When the word 'or' is used in reference to a list of two or more items, that word covers all of the following interpretations of the word: any of the items in the list, all of the items in the list and any combination of the items in the list.

The above description of illustrated embodiments of the systems and methods is not intended to be exhaustive or to limit the systems and methods to the precise form disclosed. While specific embodiments of, and examples for, the systems and methods are described herein for illustrative purposes, various equivalent modifications are possible within the scope of the systems and methods, as those skilled in the relevant art will recognize. The teachings of the systems and methods provided herein can be applied to other processing systems and methods, not only for the systems and methods described above.

The elements and acts of the various embodiments described above can be combined to provide further embodiments. These and other changes can be made to the systems and methods in light of the above detailed description.

In general, the terms used should not be construed to limit the systems and methods to the specific embodiments disclosed in the specification and the claims, but should be construed to include all processing systems that operate under the claims. Accordingly, the systems and methods are not limited by the disclosure.

While certain aspects of the systems and methods may be presented in certain claim forms, the inventors contemplate the various aspects of the systems and methods in any number of claim forms. Accordingly, the inventors reserve the right to add additional claims after filing the application to pursue such additional claim forms for other aspects of the systems and methods.

What is claimed is:

1. A gateway device for managing a set of two or more local management devices at a location comprising:
 a first interface that allows connectivity to a remote network over which the gateway can communicate to remote systems which are remote to the location;
 a second interface for communication to a local network including a set of local management devices;
 a processor;
 a memory;
 an address of a gateway registry;
 a serial number of the gateway device;
 a key;
 logic that, upon initialization of the gateway device, uses the address of the gateway registry to communicate between the gateway device and the gateway registry, wherein the gateway registry is included on a first server and the gateway server is included on a second server located physically separate from the first server, and sends, from the gateway device over the remote network, a request to the gateway registry specifying the serial number of the gateway device, and in response to the request, receives in the gateway device, from the gateway registry over the remote network, a response including an address of a gateway server that has an account associated with the gateway device for managing the location associated with the gateway device, and receives, from the gateway registry over the remote network, an identification of the account associated with the gateway device for managing the location associated with the gateway device, and communicates between the gateway device and the gateway server upon which the account associated with the gateway device is stored using authentication information derived based on the key, and communicates, over the remote network from the gateway device to the gateway server upon which the account associated with the gateway device is stored, the identification of the account that was received from the gateway registry and, in response to the communication of the identification of the account that was received from the gateway registry, receives account information from the gateway server; and logic that, after initialization of the gateway device, uses the account information to manage a set of local management devices connected to a local network located at the location, wherein the gateway device is also located at the location and connected to the local network.

2. The gateway device of claim 1, wherein the account stored on the gateway server includes historical data for the local network.

3. The gateway device of claim 1, wherein the account stored on the gateway server includes settings for devices associated with the account.

4. The gateway device of claim 1, wherein the authentication information derived based on the key is derived by applying a hash function to the key.

5. The gateway device of claim 1, wherein the serial number of the gateway device comprises the media access control (MAC) address of the gateway device.

6. The gateway device of claim 1, wherein the location comprises a residence.

7. The gateway device of claim 1, wherein the location comprises a business premises.

8. The gateway device of claim 1, wherein the remote network comprises the Internet.

9. The gateway device of claim 1, wherein the logic comprises a computer readable medium.

10. The gateway device of claim 1, wherein the logic comprises computer program code stored in a memory on the gateway device.

11. The gateway device of claim 1, wherein the logic comprises electronic circuitry included in the gateway device.

12. The gateway device of claim 1, wherein the logic comprises electronic circuitry and computer program code in the gateway device.

13. The gateway device of claim 1, wherein the logic for managing the set of local management devices comprises automation logic that initiates actions with respect to the local management devices upon certain conditions.

14. The gateway device of claim 13, wherein the automation logic is configured based on account information received from the gateway server.

15. The gateway device of claim 1, wherein the logic for managing the set of local management devices takes actions depending on a mode.

16. A system for networks at a plurality of locations, the system comprising:
a plurality of control networks, a control network including:
a plurality of management devices at a location; and
a gateway device at the location,
the gateway device including:
a first interface for communicating between systems remote from the location, and
a second interface for communicating between at least one management device at the location, and
an address of a gateway registry, and
a serial number of the gateway device, and
a key;
a gateway registry including:
serial numbers of gateway devices of the respective control networks, and
identifications of accounts for the control networks, and
the server address of a gateway server upon which the account associated with the control network is stored,
wherein the gateway registry is included on a first server and the gateway server is included on a second server located physically separate from the first server, and
logic that uses the gateway serial number of the gateway device to determine the identification of the account associated with the gateway device, and
logic that communicates to the gateway device the determined identification of the account associated with the gateway device and the server address of the gateway server upon which the account information is stored; and
the gateway server including:
details of the accounts for the control networks, and
identifications of the accounts, and
keys of gateway devices in the control networks associated with the account, and
logic that authenticates communication from respective gateway devices using the keys stored in the gateway server and authentication information received from respective gateway devices, and
logic that provides account information to respective authenticated gateway devices based on identifications of accounts provided by the respective gateway devices,
wherein after initialization of the gateway device, the gateway device comprises logic that uses the account information to manage at least one of the plurality of management devices at the location.

17. The system of claim 16, wherein the account information comprises historical data for the local network.

18. The system of claim 16, wherein the account information comprises settings for devices associated with the account.

19. The system of claim 16, wherein the logic in the gateway server that authenticates applies a hash function to the key stored in the gateway server that is associated with the account.

20. The system of claim 16, wherein the authentication information received from the gateway device is derived by applying the hash function to the key stored in the gateway device.

21. The system of claim 16, including a plurality of gateway servers and wherein the gateway registry includes a set of addresses to respective gateway servers and an association between gateway device and respective gateway server.

22. The system of claim 16, wherein the gateway registry includes a table having an association between each gateway serial number and corresponding account number and gateway server.

23. The system of claim 16, wherein the gateway server includes a table having an association between each gateway account identification and corresponding key.

24. The system of claim 16, wherein the devices are coupled by at least one of an RF, Z-wave, a wireless connection, a wired connection, and an IP connection to the local network.

25. The system of claim 16, wherein the serial number of the gateway device comprises the media access control (MAC) address of the gateway device.

26. The system of claim 16, wherein the location comprises a residence.

27. The system of claim 16, wherein the location comprises a business premises.

28. The system of claim 16, wherein the remote network comprises the Internet.

29. A method of operating a gateway device in a control network, the method comprising:
storing on the gateway device:
an address of a gateway registry, and
a serial number of the gateway device, and
a key;
using the address of the gateway registry to communicate between the gateway device and the gateway registry;
sending, from the gateway device over the remote network, a request to the gateway registry specifying the serial number of the gateway device;
in response to the request, receiving in the gateway device, from the gateway registry over the remote network, a response including an address of a gateway server that has an account associated with the gateway device for managing a set of local management devices connected to a local network located at the location associated with the gateway device;
wherein the gateway registry is included on a first server and the gateway server is included on a second server located physically separate from the first server, and
in response to the request, receiving in the gateway device, from the gateway registry over the remote network, an identification of the account associated with the gateway device for managing the location associated with the gateway device;
communicating between the gateway device and the gateway server upon which the account associated with the gateway device is stored using authentication information derived based on the key;
communicating, over the remote network from the gateway device to the gateway server upon which the account associated with the gateway device is stored, the identification of the account that was received from the gateway registry;
in response to the communication of the identification of the account that was received from the gateway registry, receiving account information from the gateway server; and
using the account information to manage the set of local management devices connected to the local network located at the location, wherein the gateway device is also located at the location and connected to the local network.

30. The method of claim 29, wherein the authentication information derived based on the key is derived by applying a hash function to the key.

31. The method of claim 29, wherein the serial number of the gateway device comprises the media access control (MAC) address of the gateway device.

32. The method of claim 29, wherein the location comprises a residence.

33. The method of claim 29, wherein the location comprises a business premises.

34. The method of claim 29, wherein the remote network comprises the Internet.

35. The method of claim 29, further comprising storing the account identification and the gateway server address in the gateway device.

* * * * *